Figure 1:
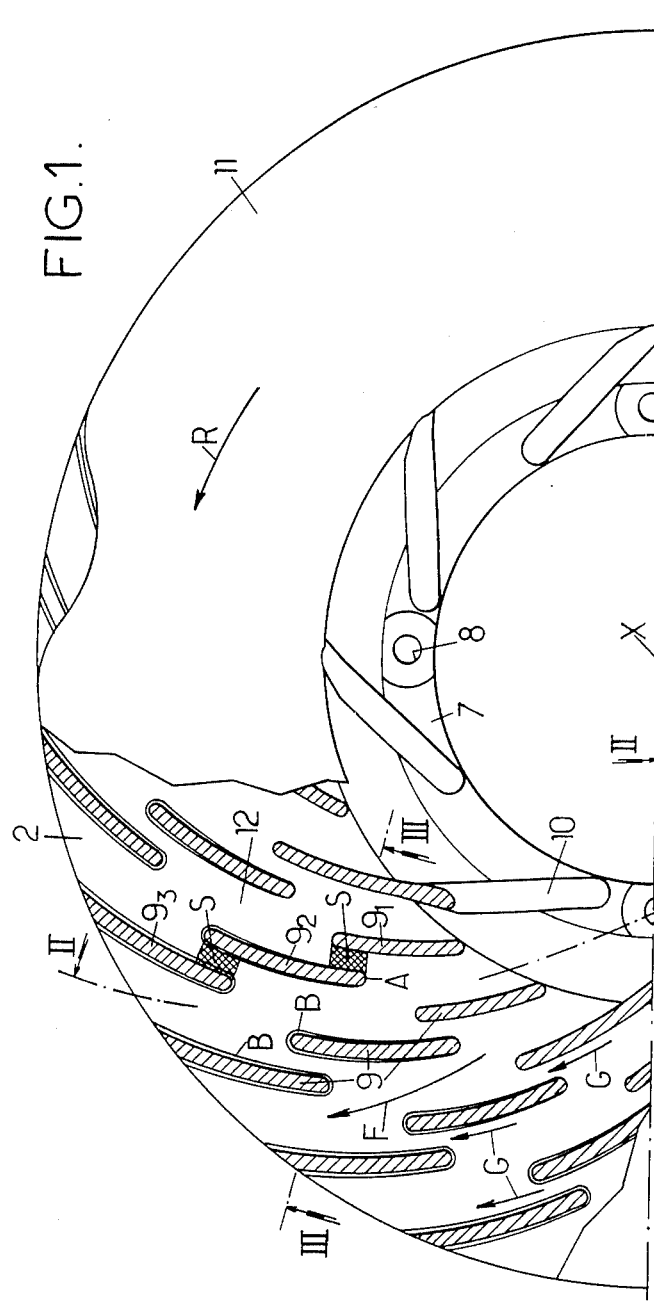

United States Patent [19]
Courtois

[11] Patent Number: 4,712,656
[45] Date of Patent: Dec. 15, 1987

[54] ARMATURE ROTORS FOR ELECTROMAGNETIC BRAKES

[75] Inventor: Jean-Claude Courtois, Vigny, France

[73] Assignee: Labavia S.G.E., France

[21] Appl. No.: 880,182

[22] Filed: Jun. 30, 1986

[30] Foreign Application Priority Data

Jul. 11, 1985 [FR] France .................. 85 10654

[51] Int. Cl.$^4$ ............... H02K 49/04; H02K 1/32
[52] U.S. Cl. .................. 188/218 XL; 188/264 AA; 192/70.12; 192/113 A
[58] Field of Search ........... 188/71.6, 218 XL, 264 A, 188/264 AA; 192/70.12, 113 A, 107 R

[56] References Cited

U.S. PATENT DOCUMENTS

| | | | |
|---|---|---|---|
| 2,358,134 | 9/1944 | Tack | 188/264 A |
| 2,684,744 | 7/1954 | Myers | 188/264 A |
| 3,298,476 | 1/1967 | Day | 192/113 A |
| 4,083,435 | 4/1978 | Gallus et al. | 188/264 A |
| 4,555,239 | 11/1985 | Miranti, Jr. | 192/113 A |

FOREIGN PATENT DOCUMENTS

| | | | |
|---|---|---|---|
| 2406133 | 8/1974 | Fed. Rep. of Germany | 188/218 XL |
| 1421952 | 1/1976 | United Kingdom | 188/218 XL |
| 2024966 | 1/1980 | United Kingdom | 188/264 AA |

*Primary Examiner*—Andres Kashnikow
*Attorney, Agent, or Firm*—Larson and Taylor

[57] ABSTRACT

To improve the cooling of the rotor armature (2), of an electromagnetic brake, joined to an outer flange (11) by a ring of ventilating fins, these fins are constituted by two or three rings of incurved tiles ($9_1$, $9_2$, $9_3$) straddling radially in part.

8 Claims, 3 Drawing Figures

ARMATURE ROTORS FOR ELECTROMAGNETIC BRAKES

The invention relates to armature rotors for electromagnetic brakes, particularly for vehicles, said rotors comprising at least one disc of ferromagnetic material arranged to move opposite a stator ring of alternately positive and negative electromagnetic poles from which it is only separated by an air gap, said disc being then braked and heated due to the fact of the creation of eddy currents in its mass.

It is directed more particularly, among these rotors, to those of which the disc is joined to a fastening ring by a crown of arms forming ventilation fins, the portions of greatest diameter of these arms projecting axially on the surface of the disc opposite the air gap and being inclined to the corresponding radii, and the crests of these portions being joined to one another by an annular flange.

The removal of the heat generated in the disc of such a rotor by the eddy currents, on the placing in operation of the brake equipped with this rotor, is done essentially by conduction to the flange through the arms and by radiation and convection from the disc, from the arms and from the flange, the latter phenomenon being strongly reinforced by ventilation: in fact the fin profile adopted for the arms causes the rotor to play the part of a ventilator by sweeping with a flow of cooling air the hot surfaces to be cooled of the disc, of the arms and of the flange.

With the known methods of construction of the rotors concerned—for which the whole of the disc, of the ring, of the arms and of the flange is generally constituted by a single cast block of steel—said removal of the heat generated in the disc leaves something to be desired.

Thus the disc concerned may be brought to red heat, its temperature reaching or even exceeding a value of the order of 700° C., whilst the flange remains at a temperature below 500° C.

Now it is important to cool the disc efficiently.

In fact, the braking torque which can be generated by the retarder equipped with this disc is reduced to a considerable proportion when this disc heats up.

Thus this torque may be decreased from a value C to a value C/3, for given values of the rotary speed and of the electrical power consumed, when the disc is heated from ambient temperature to a temperature of the order of 700° C.

It is a particular object of the invention to improve the cooling of the disc in the course of the operation of the retarder and hence to increase the value of the hot torque generated by this apparatus.

To this end rotors of the type concerned according to the invention are essentially characterised in that the arm portions forming cross pieces between the flange and the disc are constituted by a plurality of sections each extending over one portion only of the radial width of these two annular elements, each cross piece section exhibiting the shape of a curved tile orienting its concave surface rearwards with respect to the direction of rotation of the rotor.

In preferred embodiments, recourse is had in addition to one and/or the other of the following arrangements:
the tiles form a plurality of concentric rings, tiles composing each ring are identical with one another and equidistant, the numbers of the tiles composing the different rings are identical among themselves and each tile of one ring straddles radially in part the tile radially closest to each neighboring ring, each tile is slightly angularly offset forward with respect to the outer extension of the tile closer than itself to the axis of the rotor, when considering the direction of rotation of the rotor, each tile straddles circumferentially in part the tiles of each neighboring ring, the different rings of tiles are juxtaposed radially around one another, if the straddling of the tiles in pairs in the directions perpendicular to the middle surfaces of these tiles is considered, the cross-section of each straddling zone concerned through a plane perpendicular to the axis of the rotor shows substantially the shape of a rectangle and preferably that of a square, the number of rings of tiles is equal to three, the number of the tiles of each ring is three times greater than that of the arms, the tiles are thickened at the level of their bases contiguous with the disc and this thickening is all the more pronounced as the tile zone concerned is more remote from the axis of the rotor.

The invention comprises, apart from these main features, certain other features which are preferably used at the same time and which will be more explicitly considered below.

In the following, a preferred embodiment of the invention will be described with reference to the accompanying drawings, without of course being limiting.

Figure 2:
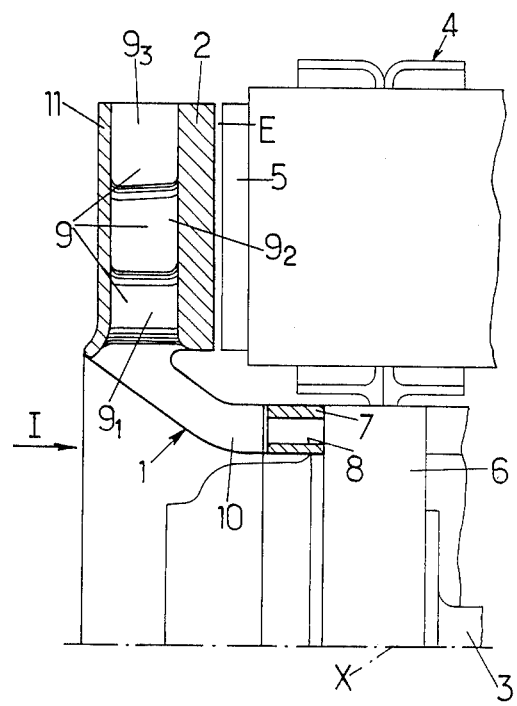

FIGS. 1 and 2 of these drawings show an electromagnetic brake rotor constructed according to the invention respectively in half view at the end along the arrow I of FIG. 2 and in axial half section along the line II—II FIG. 1, the corresponding stator being in addition shown partly phantom-wise in FIG. 2.

Figure 3:
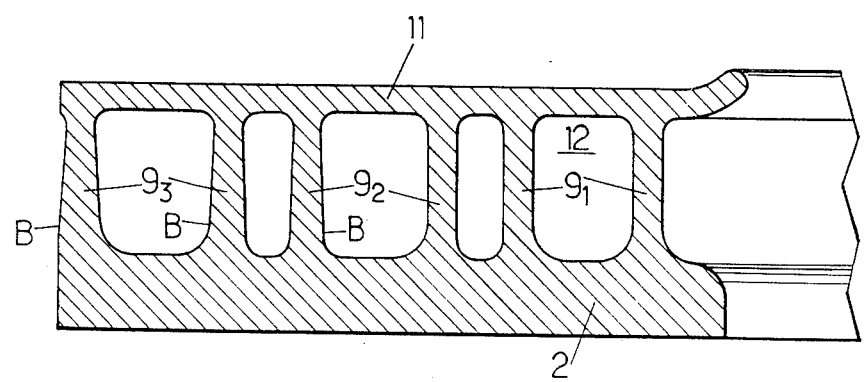

FIG. 3 is a partial cross-section of FIG. 1 along the line III—III.

The word "rotor" used in the present description means more precisely each of the one-piece subassemblies which are comprised by the rotor unit of axis X of an electromagnetic brake or "eddy current" brake and which comprise an armature disc 2 of ferromagnetic material.

As is known, such a disc 2 is integrally fixed to the shaft 3 to be braked, such as the transmission shaft of a vehicle, and it is mounted so as to be able to pass in front of the stator 4 of the brake, or more precisely in front of a ring of inductor poles 5 alternately positive and negative forming part of this stator, with the interposition of an air gap E, the disc 2 concerned being then the site of eddy currents which are manifested by a braking and a heating of this disc.

The rotor unit of the brake comprises, in addition to the rotor or sub-assembly defined above, which is single or preferably split symmetrically on each side of the rotor, an intermediate part 6 of revolution around the axis X, such as a sleeve, hub or plate, itself fixed, generally by bolting, to the shaft 3 to be retarded, each "rotor" 1 concerned here being on its side fixed by bolting to this intermediate part.

In a manner also known in itself, each rotor 1 comprises, in addition to the disc 2:
a fastening ring 7 of average diameter less than the inner diameter of the disc 2, pierced by axial bores 8, threaded or not, designed to receive bolts (not shown) for fixing this ring to the intermediate part 6, a ring of ventilating fins 9 projecting from the surface, of the disc 2, opposite its surface intended to define the air gap E, certain at least of these fins (particularly one in two or one in three) being extended towards the axis X so as to form arms 10 joining the disc to the ring 7, and a rim or annular flange 11 extending generally parallel with the disc and joining the crests of the portions of largest diameter of the fins 9 so as to form between these fins, the disc and the flange guide channels 12 for the ventilation air.

The fins 9 and the arms 10 which extend them if required are inclined rearwards with respect to the direction of rotation R of the rotor, if the increasing radii are considered.

The arms 10 are preferably bent axially, as in the embodiment illustrated in FIG. 2, so as to "bring back" axially the ring 7 towards the inside of the stator and thus to reduce the axial bulk of the central portion of the rotor.

However said arms 10 could also be "straight", their middle lines remaining then substantially contained within the same transverse plane.

The number of arms 10 of each rotor is advantageously equal to eight and the total number of its fins 9, sixteen or twenty four.

It is the removal of the heat generated in the discs 2 by the creation of eddy currents on the placing in operation of the retarder that the present invention proposes to improve.

To this end, each fin 9 is subdivided into at least two sections separated from one another, straddling each other radially in part, and each having the shape of an incurved tile orienting its concave surface rearwards if the direction of rotation R of the rotor is considered.

In the preferred embodiment illustrated, the tiles into which the same fin is subdivided are substantially identical with one another, they are three in number, denoted respectively by the references $9_1$, $9_2$ and $9_3$ so that the set of tiles compose three concentric rings with identical numbers of tiles for each ring, and each tile is offset angularly forwards, if the direction of rotation R, with respect to the outer exension of the neighboring tile closer than it to the axis X, is considered.

The rings of tiles concerned may be simply juxtaposed concentrically two by two.

In a modification, each tile of one ring dips radially for a short distance between the tiles of neighboring rings, which corresponds to a slight circumferential straddling of these tiles.

Experience shows that the replacement of the previously known one-piece fins by the abovedefined sets of tiles improves to a notable proportion the cooling of the disc whilst increasing only to a negligible proportion to the torque necessary for driving the rotor due to the fact of a very slight increase in the "losses by ventilation".

This improvement in the cooling is due to the conjunction of several phenomena and in particular of the following:

increase in the turbulence of the ventilation air, which is manifested by a renewed attack of the tiles through said air, with the application of air streams even against the concave surfaces behind said tiles, surfaces normally subjected to reduced pressures, which improves the desired heat exchange between the metal surfaces to be cooled and the air, increase in the surface area of said exchange surfaces.

If each mutually straddling zone of two successive tiles in a direction perpendicular to the surfaces, of these tiles, which straddle each other, surfaces which are parallel with each other, is considered, the cross-section S (FIG. 1) of this zone in a plane perpendicular to the axis X is substantially rectangular and preferably square.

This latter hypothesis seems to correspond to an aerodynamic optimum, taking into account both the contradictory exigencies of maximum cooling and the minimum ventilation losses, that is to say, the minimum resistance opposed to the driving of the rotor.

With the construction described above, the path taken by the ventilation air from the inside to the outside of the rotor may be either the direct path indicated by the arrow F (FIG. 1), for which the air is essentially guided by the inner surfaces of the downstream ends of successive tiles, that is to say their ends most remote from the axis X, or one of the indirect paths G passing between the successive tiles.

These two types of paths F and G are generally combined successively for the greater part of the volume of air flow.

To benefit to the maximum from the possibility of extracting by conduction and convection, by means of the fragmented fins or tiles described above, the heat generated in the disc 2, it is advantageous to increase the cross-section of the tiles close to the zones, of the disc, where the amount of heat generated is highest, which zones correspond to the longest circumferences and which are hence most remote from the axis X.

To this effect the bases of the tiles, which are contiguous with the disc in its zones of greatest radius, are thickened.

Thus, in the embodiment illustrated, the crosssection of each inner tile 9, considered in a plane parallel to the axis X and perpendicular to the middle surface of this tile, exhibits over the whole extent of this tile the shape of an elongated rectangle (FIG. 3) whilst, for each intermediate section $9_2$, this cross section develops progressively from said rectangular shape in the upstream zone of the tile to the isoceles trapezial shape in its downstream zone and that this isoceles trapezial shape is again found over the whole extent of each outer tile $9_3$ whilst being more and more pronounced towards the increasing radii.

The bases so thickened of the tiles $9_2$ and $9_3$, corresponding to the large bases of the isoceles trapezia, are to be seen at B in FIGS. 1 and 3.

As a result of which, and whatever the embodiment adopted, there is finally provided an armature rotor for an electromagnetic brake whose constitution, operation and advantages (particularly the improvement in cooling and consequently the increase in the hot braking torque) result sufficiently from the foregoing.

As is self evident, and as it results besides already from the foregoing, the invention is in no way limited by those of its types of application and embodiments which have been more especially envisaged; it encompasses thereof, on the contrary, all modifications, particularly:

those where the number of rings of tiles would be different from three and in particular equal to two, those where these tiles of the various rings would have different lengths in the direction of flow of the ventilation air, those where each tile would be hollowed in its thickness by a pocket opening into the atmosphere through the free transverse surface of the flange 11, of which pocket the bottom would be constituted by the disc 2 itself conforming to the teachings of U.S. patent application Ser. No. 844,594.

I claim:

1. Armature rotor of an electromagnetic brake, comprising at least one disc (2) joined to a fastening ring (7) by a crown of arms (10), a plurality of ventilation fins, the portions of largest diameter (9) of these fins projecting axially on the disc and being inclined to the corresponding radii and their crests being joined to one another by an annular flange (11), characterised in that the fins (9) forming cross pieces between the flange and the disc are constituted by a plurality of sections ($9_1$, $9_2$, $9_3$) each extending over one portion only of the radial width of these two annular elements (2 and 11), each cross-piece section exhibiting the shape of a curved tile orienting its concavity rearwards with respect to the direction of rotation (R) of the rotor, said tiles forming a plurality of concentric rings which are radially overlapping with respect to each other, the tiles composing each ring being identical with one another and equidistant from each other, the numbers of tiles composing the different rings being identical with one another, and each tile of any ring being slightly offset angularly with respect to the outer extension of the closest tile of the ring which is placed immediately radially inside said ring.

2. Rotor according to claim 1, characterised in that each tile is slightly offset angularly forward with respect to outer extension of the tile closer than it to the axis (X) with respect to the direction of rotation (R) of this rotor.

3. Rotor according to claim 1, characterised in that each tile straddles circumferentially in part the tiles of each neighboring ring.

4. Rotor according to claim 1, characterised in that the different crowns of tiles are juxtaposed radially around one another.

5. Rotor according to claim 2 characterised in that, with respect to the straddling of the tiles ($9_1$, $9_2$, $9_3$) two by two along directions perpedicular to the middle surfaces of these tiles, the cross section of each straddling zone considered through a plane perpendicular to the axis of the rotor exhibits substantially the shape of a rectangle and preferably that of a square (S).

6. Rotor according to claim 1, characterised in that the number of rings of tiles is equal to three.

7. Rotor according to claim 1, characterised in that the number of tiles of each ring is three times greater than that of the arms (10).

8. Rotor according to claim 1, characterised in that the tiles ($9_1$, $9_2$, $9_3$) are thickened at the level of their bases (B) continguous with the disc (2) and in that this thickening is more pronounced at portions of the zone more remote from the axis (X) of the rotor.

* * * * *